United States Patent [19]
Molny et al.

[11] Patent Number: 5,341,681
[45] Date of Patent: Aug. 30, 1994

[54] STEPPED GRAVITY GRADIOMETER

[75] Inventors: Marvin J. Molny; Melvin Feinberg, both of Huntington, N.Y.

[73] Assignee: Unisys Corporation, Blue Bell, Pa.

[21] Appl. No.: 125,840

[22] Filed: Nov. 27, 1987

[51] Int. Cl.$^5$ ............................................. G01V 7/02
[52] U.S. Cl. .................................................. 73/382 G
[58] Field of Search ........................ 73/382 G, 382 R

[56] References Cited

U.S. PATENT DOCUMENTS

| | | | |
|---|---|---|---|
| 3,630,086 | 12/1971 | Wilk | 73/382 G |
| 3,731,537 | 5/1973 | Tragerer | 73/382 G |

OTHER PUBLICATIONS

Metzger, E. H., "Recent Gravity Gradiometer Developments," AIAA vol. 77-1081 (306-315), Aug. 8-9, 1977.

*Primary Examiner*—Ian J. Lobo
*Attorney, Agent, or Firm*—Albert B. Cooper; Mark T. Starr

[57] ABSTRACT

A gravity gradiometer instrument alternately and sequentially rotatable in opposing angular increments provides a measure of the gravity gradient in-line and cross components without requiring real-time generation of trigonometric harmonic components, continuous demodulation to separate the component data signals, or filtering. Demodulation of the output data is accomplished by simple summing of the data from successive angular positions of radially opposing accelerometers. Precise control of the rotational speed is not required. Further, the accelerometer complement is minimal and because the direction of rotation is periodically reversed, a twist capsule is used rather than slip rings, thereby avoiding the noise and maintenance problems associated therewith.

14 Claims, 2 Drawing Sheets

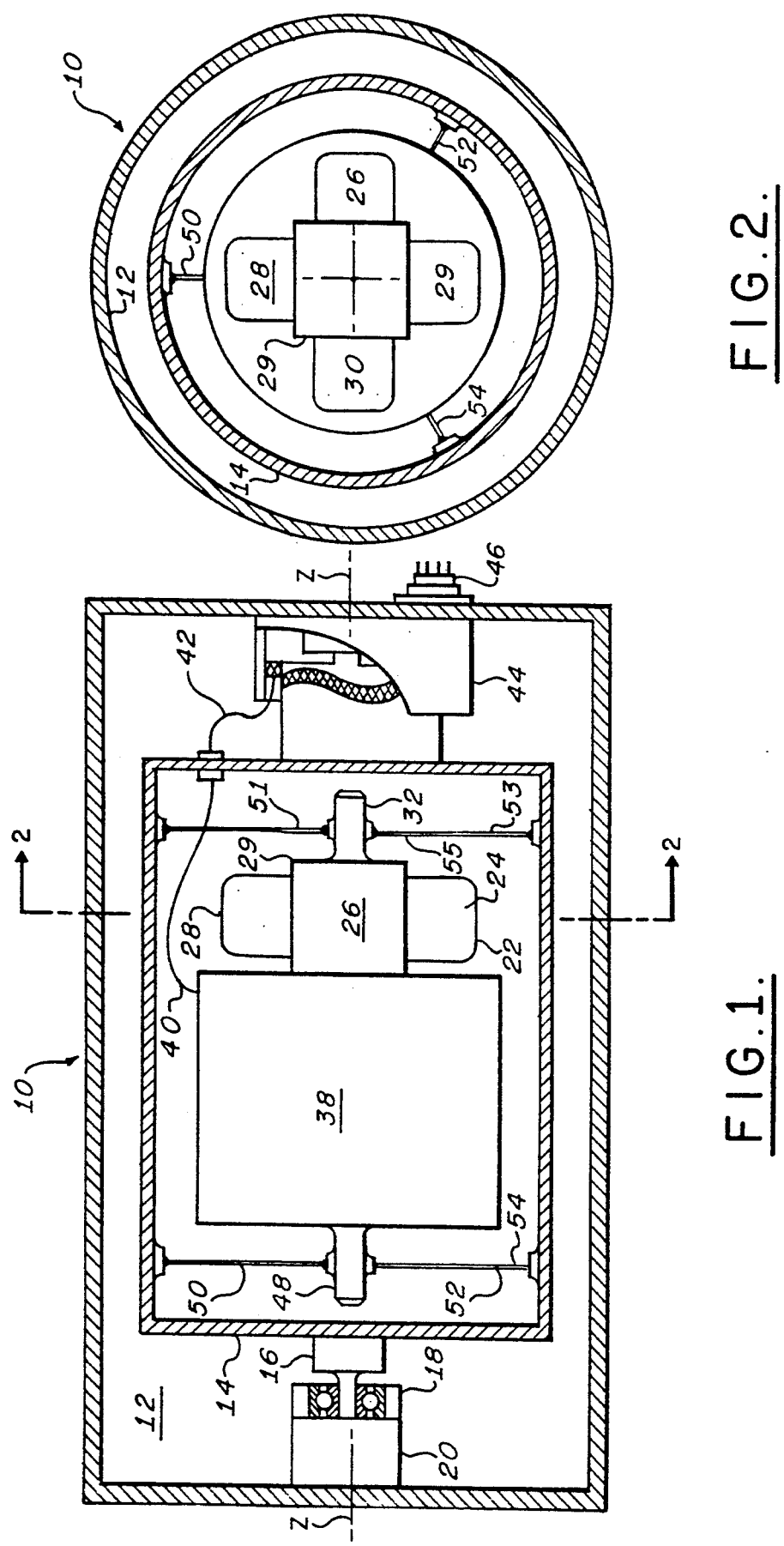

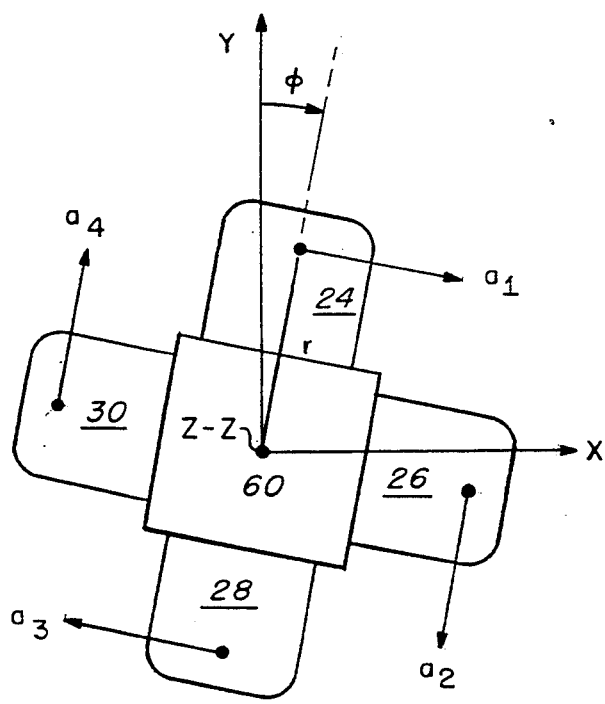

$a_1 + a_2 - a_3 - a_4 = 4r \left[ A \sin(2\phi) + B \cos(2\phi) \right] + (e_1 - e_2 - e_3 - e_4)$ $a_1, a_2, a_3, a_4$ = SENSED ACCELERATION COMPONENT ALONG INPUT AXES OF ACCELEROMETERS $r$ = DISTANCE FROM AXIS OF ROTATION (Z-Z) TO ACCELEROMETER $\phi$ = ROTATION ANGLE OF ACCELEROMETER ARRAY AT POINT OF MEASUREMENT $e_1, e_2, e_3, e_4$ = ERROR COMPONENT OF ACCELEROMETER OUTPUT SIGNAL $A$ = IN-LINE COMPONENT OF GRAVITY GRADIENT $B$ = CROSS-COMPONENT OF GRAVITY GRADIENT

FIG. 3.

STEPPED GRAVITY GRADIOMETER

The U.S. Government has rights in this invention pursuant to contract number N00030-82-C-0079 awarded by the Department of the Navy.

BACKGROUND OF THE INVENTION

1. Field of the Invention

This invention relates to gravity gradiometer systems and more specifically to a gravity gradiometer for use in navigation in moving vehicles and in other applications.

2. Description of the Prior Art

A gravity gradiometer instrument of the prior art has been described in a paper prepared by E. H. Metzger for the AIAA Guidance and Control Specialist Conference, Hollywood, Fla., Aug. 8-9, 1977 and entitled "Recent Gravity Gradiometer Developments", which is hereby incorporated by reference. The instrument employs rotating inertial sensors whose outputs are differentially summed to provide substantially simultaneous measurements of cross and in-line values of gravity gradients. The gravity gradient components may be expressed as a gravity gradient matrix, one such symbology in common use being:

$$\begin{vmatrix} G_{XX} & G_{XY} & G_{XZ} \\ G_{YX} & G_{YY} & G_{YZ} \\ G_{ZX} & G_{ZY} & G_{ZZ} \end{vmatrix}$$

A cross gravity gradient is defined in the art as the rate of change of a given component of gravity at some point in space with translation of this point in space in a direction transverse to the direction of that component of gravity. The components $G_{XY}$, $G_{XZ}$, and the like are cross gradients. An in-line gravity gradient is defined as the rate of change of a given component of gravity at some point in space with translation of that point in space in the direction of the gravity component. The components $G_{XX}$, $G_{YY}$, and $G_{ZZ}$ are in-line gradients.

The aforementioned Metzger instrument is comprised of a continuously rotated cluster of four accelerometers to obtain continuous measurements pertaining to one cross component of the local gravity gradients and a combination of two in-line components. By mathematical analysis, both the in-line and cross terms may be computed. Data from the rotating accelerometer cluster is transferred by means of slip rings for utilization by an external computer. The external computer is also used to control cluster rotation speed, balance the accelerometer scale factors, and compute the gravity gradient components from the accelerometer outputs. However, this instrument is highly sensitive to variations in rotational speed. Because of this sensitivity, special features are required to reduce both rotation speed variations and their effects. These features are as follows:

1. An encoded disc and associated sensor to provide precise measurement of cluster angular position for use in controlling cluster rotation speed in a closed loop manner.
2. Use of a four-accelerometer cluster, rather than a two-accelerometer cluster needed for a basic gradient measurement, to allow cancellation of the effects of residual speed variations and scale factor imbalances in the accelerometer outputs.
3. Special motor-drive circuitry to induce a small high frequency fluctuation in cluster rotational speed. This allows detection and dynamic correction of imbalances among the scale factors of the four accelerometers. Such imbalances would otherwise cause imperfect cancellation of the effects of residual rotational speed variations.
4. An external microprocessor to control rotor speed on the basis of the angular position data described above, and a firmware program using a second microprocessor to adjust the accelerometer scale factors on the basis of the effects of the forced rotor speed fluctuation introduced by the motor drive circuitry.

Additionally, the continuous rotation of the accelerometer cluster imposes two other requirements on the instruments:

1. Slip rings to transfer electrical power and gradient output data to and from the accelerometer cluster.
2. The use of continuous demodulation and filtering to separate the in-line and cross gravity gradient components sensed by the instrument.

SUMMARY OF THE INVENTION

The apparatus of the present invention includes a gravity gradiometer instrument of the type including a housing having a cluster of accelerometers disposed in a symmetrical array within a cage and rotatable about an axis of rotation. The system includes a stepping type drive motor for alternately and sequentially rotating the accelerometers over a predetermined angular displacement about the rotational axis in first and second opposing directions. The accelerometer outputs are directly coupled without slip rings or brushes to provide an output signal corresponding to the gravity gradient components. In a preferred embodiment, computational means are provided for summing the relative accelerations between accelerometer sensors at predetermined angular displacements, so as to provide a direct measure of the in-line and cross components of the gravity gradient.

BRIEF DESCRIPTION OF THE DRAWINGS

FIG. 1 shows a pictorial diagram in cross-section of the apparatus of the present invention.

FIG. 2 shows a sectional view of the accelerometer cluster used with the present invention.

FIG. 3 shows an end view of the accelerometer cluster utilized with the present invention and the geometric relations appertaining thereto.

DESCRIPTION OF THE PREFERRED EMBODIMENT

Referring now to FIG. 1, a gravity gradiometer instrument of the present invention is shown in sectional view. The gravity gradiometer includes a cylindrical housing 10 defining a chamber 12. A rotatable cage 14 is disposed within the chamber 12 and coupled to the housing by means of a shaft 16 and bearings 18 for rotation by a stepper motor 20. The stepper motor 20 may be any of the type well known in the art which may be incrementally advanced over a predetermined displacement in response to control electronics, not shown. The gradient sensor 22 is preferably comprised of a plurality of accelerometer elements 24, 26, 28, and 30, mounted in a cluster on a block 29, but the invention is operational with at least two such elements at 180° separation, such as accelerometers 24, 28, or 26, 30. The accelerometers are arranged in a symmetrical cluster or array for rotation with cage 14 about an axis Z—Z, the accelerometer cluster being comprised of a plurality of accelerometer elements rigidly affixed to a rotatable mounting block, such that their sensing axes all lie in a plane perpendicular to the axis of rotation. The accelerometers 24–30 may be of the type generally known as force rebalance pendulum accelerometers such as the model VII-G as manufactured by Bell Aerospace division of Textron Inc., Buffalo, N.Y., and which provide an output signal whose amplitude is indicative of the component of the forces due to gravity acting parallel to their sensing axis. Such accelerometers measure total acceleration and do not distinguish between vehicle acceleration and acceleration due to gravity forces. By taking an algebraic sum of the outputs from two opposing accelerometers a known distance apart, the common-mode vehicular acceleration may be cancelled, and the gravity gradient may be computed.

The accelerometer array 22 is supported at a proximal shaft 32 and distal shaft 48 by a triad suspension of wires 50, 52, 54 and 51, 53, 55 in tension. The purpose of the suspension by the wire elements is to allow for continuous closed loop linear shaking of the accelerometer cluster parallel to the axis of rotation to permit detection and correction of any sensitivity to axial accelerations. The accelerometers are coupled by conductors (not shown) to rotatable electronics 38 which operate the accelerometers and transmit their output signals for computation of the gravity gradient components. The output of rotatable electronics 38 is provided on a lead 40 through a wall of cage 14 to a further lead 42 for coupling to a twist capsule 44. Twist capsule 44 provides direct, electrical and physically continuous coupling between the signal outputs of the rotatable electronics 38 and an output connector 46 for coupling to an external computer, not shown. Electronics 38 is supported by the distal shaft 48. While a four-accelerometer array is shown to reduce system errors in data gathering, only a two-accelerometer cluster is required to make the basic gravity gradient measurements.

Section 2—2 of FIG. 1 is a cross-section of the accelerometer array shown in end view in FIG. 2. Referring now to FIG. 2, the housing 10 is seen to be preferably in the form of a cylinder. Cage 14 is supported within the chamber 12. Accelerometers 24, 26, 28, and 30 are disposed symmetrically about the axis of rotation while supporting wires 50, 52, 54 are triangularly disposed, having first ends affixed to the cage 14 and second ends affixed to the distal shaft 48. A similar triad of wires (not shown) is affixed to proximal shaft 32 and cage 14.

Referring now to FIG. 3, the operation of the present invention will be described with respect to coordinate axes X and Y. In operation, cage 14 is sequentially advanced through integral angular displacements, preferably in 45° increments, through a range of 360°, after which the direction of rotation is reversed and the stepping sequence retraced until the 0° point is again reached. Accelerometers 24, 26, 28, and 30 are configured about a rotational axis Z orthogonal to coordinate axes X and Y. The accelerometer array is shown displaced in an instant of time by an angle $\phi$ from the Y axis. The accelerometers have a sensing axis in the XY plane orthogonal to a radius of rotation r, representative of the distance from the axis of rotation Z to the sensing point of the accelerometer.

In operation, the accelerometer outputs will continuously represent the magnitudes of the components of gravity parallel to their sensitive axes, which quantities are denoted by the values $a_1$, $a_2$, $a_3$, $a_4$, for accelerometers 24, 26, 28 and 30, respectively. The gravity gradient data are obtained by appropriately summing and differencing these outputs as indicated in equation (1):

$$(a_1+a_2-a_3-a_4)=4r[A\sin(2\phi)+B\cos(2\phi)]+(e_1+e_2-e_3-e_4) \tag{1}$$

where:

$a_1$, $a_2$, $a_3$, and $a_4$ = accelerations sensed by the four accelerometers.

$A = \frac{1}{2}(G_{YY}-G_{XX})$ in-line component of gravity gradient.

$B = G_{XY}$ = cross component of gravity gradient.

$\phi$ = rotation angle of the accelerometer cluster.

$e_1$, $e_2$, $e_3$, $e_4$ = errors of the four accelerometers.

r = radius of rotation.

For a two-accelerometer system the foregoing becomes:

$$(a_1+a_2)=2r[A\sin(2\phi)+B\cos(2\phi)]+(e_1+e_2) \tag{2}$$

The quantities A and B are the basic outputs, representative of the in-line and cross gravity gradient components sensed by the instrument. In the prior art instrument, because the accelerometer cluster is continuously rotating, the rotation angle is continuously varying and A and B must be separated by a process of demodulation. This is accomplished by continuously multiplying the summed accelerometer outputs of equation (1) by factors equal to the sine and cosine of (2$\phi$) as follows:

$$\sin(2\phi)(a_1+a_2-a_3-a_4)=4r[A-A\cos(4\phi)+B\sin(4\phi)]+(e_1+e_2-e_3-e_4)\sin(2\phi) \tag{3}$$

and $$\cos(2\phi)(a_1+a_2-a_3-a_4)=4r[B+A\sin(4\phi)+B\cos(4\phi)]+(e_1+e_2-e_3-e_4)\cos(2\phi) \tag{4}$$

Since the processed outputs now contain undesired terms at twice the rotational angle (2$\phi$) and four times the rotational angle (4$\phi$), they may be separated by filtering to provide a term A proportional to the in-line gradient component $$A=K[\sin(2\phi)(a_1+a_2-a_3-a_4)][F] \tag{5}$$

where [F] represents the transfer function of a low-pass filter, and a term B proportional to the cross gradient component $$B=K[\cos(2\phi)(a_1+a_2-a_3-a_4)][F] \tag{6}$$

where K is a proportionality factor.

In the present invention, since the accelerometer data are collected at fixed angular positions, the foregoing computations can be greatly simplified. The stepped rotation of the cage 14 allows direct separation of in-line and cross gradients without the real-time computations requiring generation of sine and cosine of 2$\phi$, multiplication of the accelerometer data by the generated quantities, and filtering. For example, if the stepper motor 20 is commanded to position the accelerometer array 22 at sequential rotational angles of 0°, 45°, 90°, 135°, 180°, 225°, 270°, 315°, 360°, 315°, 270°, etc., the corresponding summed accelerator outputs of equation (2) will be:

TABLE I

| $\phi$ | $(a_1 + a_2)$ |
|---|---|
| 0° | $2rB + (e_1 + e_2)$ @ 0° |
| 45° | $2rA + (e_1 + e_2)$ @ 45° |
| 90° | $-2rB + (e_1 + e_2)$ @ 90° |
| 135° | $-2rA + (e_1 + e_2)$ @ 135° |
| 180° | $-2rB + (e_1 + e_2)$ @ 180° |
| 225° | $2rA + (e_1 + e_2)$ @ 225° |
| 270° | $-2rB + (e_1 + e_2)$ @ 270° |
| 315° | $-2rA + (e_1 + e_2)$ @ 315° |
| 360° | $2rB + (e_1 + e_2)$ @ 360° |
| 270° | $-2rB + (e_1 + e_2)$ @ 270° |

In each case, the quantity $(e_1+e_2)$ represents the sum of the accelerometers errors as of the time of the measurements at the various rotation angles. If four accelerometers are used, this quantity will be $(e_1+e_2-e_3-e_4)$ at the predetermined angle. While the errors may vary from one accelerometer to the other, they are substantially constant with angle of rotation. Therefore, the accuracy of measurement of the gravity gradients may be substantially improved by appropriately differencing the quantity $(a_1+a_2)$ determined at successive rotation angles. For example, if the quantity $(a_1+a_2)$ determined at rotation angle $\phi=90°$ is subtracted from that obtained at rotation angle $\phi=0°$, the result is $$(a_1+a_2)(0°)-(a_1+a_2)(90°)=2B(2r)+[(e_1+e_2)(0°)-(e_1+e_2)(90°)] \quad (7)$$

The magnitude of the desired term, B, is thereby doubled and the error term $(e_1+e_2)$ is reduced to the difference in error between the measurements at $\phi=0°$ and $\phi=90°$.

It may be seen that the novel features of this invention which utilize a stepped rotation in one direction and a periodic reversal of the direction of rotation, rather than continuous rotation in a single direction, allow the gradient-related data to be collected while the accelerometer array is stationary. This provides the following advantages:

1. The controllable-speed motor of the prior art can be replaced by a simple, inexpensive stepper motor.
2. No sensors nor computational capability to assure constant rotational speed are required.
3. No special measures need to be taken to reduce the sensitivity of the accelerometer array to residual speed variations.
4. Real-time computations to process the instrument data outputs are greatly simplified.
5. Slip rings and brushes are eliminated, which avoids noise and maintenance problems associated therewith.

While the invention has been described in its preferred embodiment, it is to be understood that the words which have been used are words of description rather than limitation and that changes may be made within the purview of the appended claims without departing from the true scope and spirit of the invention in its broader aspects.

I claim:

1. An improved gradiometer for measuring gravity gradient components, of the type including a housing defining a chamber, a cage contained within the chamber and coupled to the housing such as to be rotatable relative to the housing about an axis of rotation, gradient sensor means disposed within the cage and having a sensing axis aligned in a plane orthogonal to the axis of rotation of the cage and responsive to gravitational accelerations parallel to the sensing axis, and further including electrical output means coupled to the gradient sensor means for providing an output signal corresponding to relative gravitational accelerations sensed by said gradient sensor means and indicative of at least one gravity gradient component, wherein the improvement comprises:

means for alternately and sequentially rotating said gradient sensor means over a predetermined angular displacement about said axis in first and second directions wherein said displacement does not exceed 360°, and wherein said output signal is periodically sensed in opposing directions while said gradient sensor means is stationary relative to said axis of rotation.

2. The gradiometer as set forth in claim 1, wherein said cage comprises a cylindrical body.

3. The gradiometer as set forth in claim 2, wherein said gradient sensor means comprises a force rebalance pendulum accelerometer.

4. The gradiometer as set forth in claim 3, wherein said gradient sensor means comprises an array of at least two force rebalance pendulum accelerometers symmetrically disposed about said axis of rotation.

5. The gradiometer as set forth in claim 4, wherein said means for rotating said cage comprises a stepping motor for providing incremental angular displacements of said cage about said axis.

6. The gradiometer as set forth in claim 5, wherein said electrical output means comprises computational means for providing algebraic sums and differences of said output signals corresponding to said relative accelerations at said predetermined angular displacement of said cage about said rotational axis.

7. The gradiometer as set forth in claim 6, wherein said gravity gradient components comprise in-line and cross gravity gradients and said output signals further comprise error components of said sensor means.

8. The gradiometer as set forth in claim 7, said computational means further comprising a product of a factor representative of a radial displacement of a sensing axis of one of said accelerometers and an algebraic sum, said sum further comprised of products of at least one of said in-line or cross gravity gradient components and a trigonometric function of said predetermined angular displacement.

9. The gradiometer as set forth in claim 8, said computational means comprising sums and differences of said error components introduced by said accelerometers at said predetermined angular displacement.

10. The gradiometer as set forth in claim 9, wherein said output signals further comprise a product of one of said output signals corresponding to said relative accelerations at a predetermined angular displacement and said factor derived from said radial displacement of said gradient sensor means.

11. The gradiometer as set forth in claim 10, wherein said computational means further comprises means for providing algebraic sums and differences of output signals representative of gravity gradient components at a plurality of said angular displacements, said displacements so constructed and arranged at multiples of a predetermined angle as to provide a trigonometric relationship so that only in-line or cross gradient terms result from said algebraic computation.

12. The gradiometer as set forth in claim 11, wherein said electrical output means comprises an electrically and physically continuously conducting flexible member operative over a 360° angular displacement in two opposing directions.

13. The gradiometer as set forth in claim 12, further comprising means for axially suspending said gradient sensor means within said cage so as to allow linear movement of said cage parallel to said axis of rotation.

14. The gradiometer as set forth in claim 13, said means for axially suspending said gradient sensor means comprising a plurality of wire members configured in a triad and having first ends affixed to said chamber and second ends affixed to proximal or distal portions of said cage.

* * * * *